March 18, 1969  C. A. GRANTOM  3,433,488
SELF-ADJUSTING PACKING ASSEMBLY
Filed May 23, 1968 Sheet 2 of 2
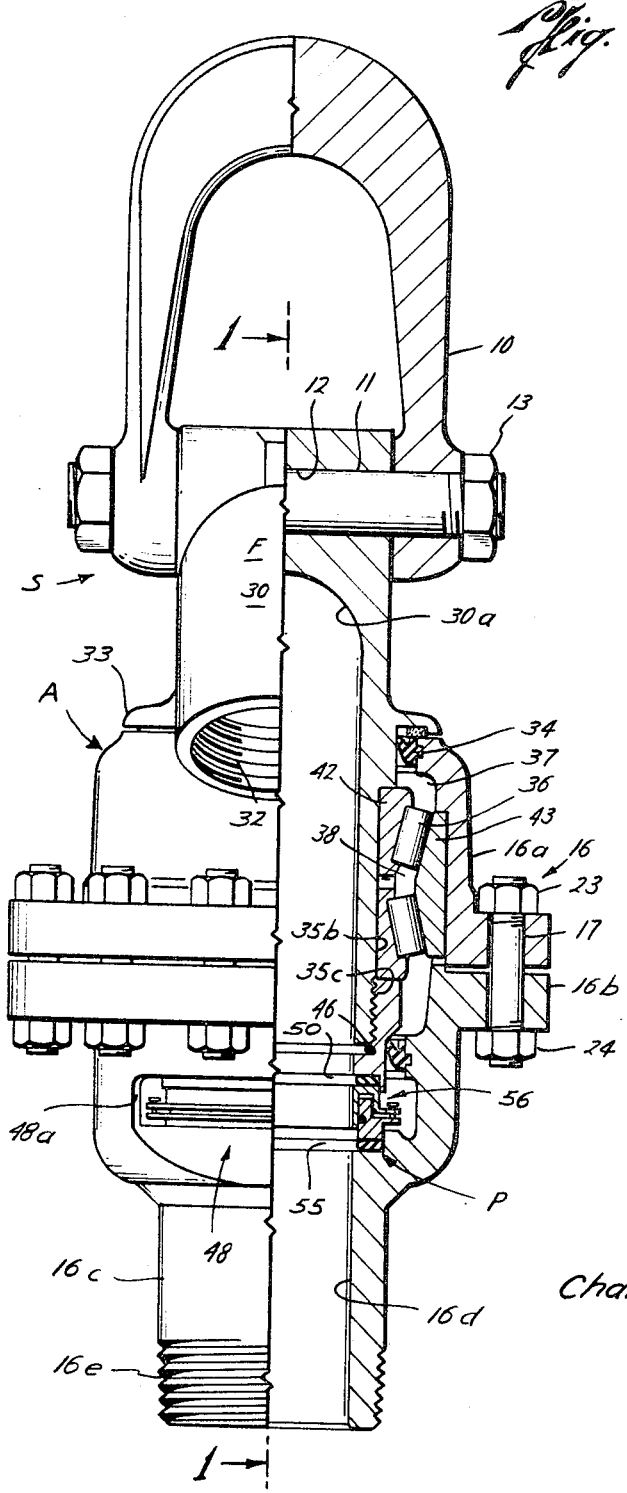
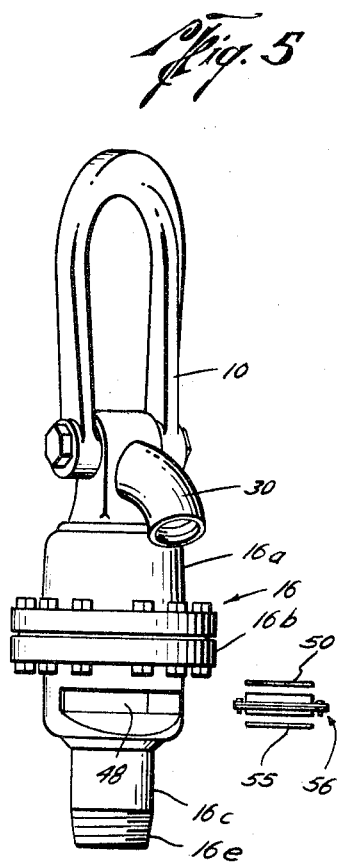
Charles A. Grantom
INVENTOR
BY
Hayden Pravel Wilson & Matthews
ATTORNEYS

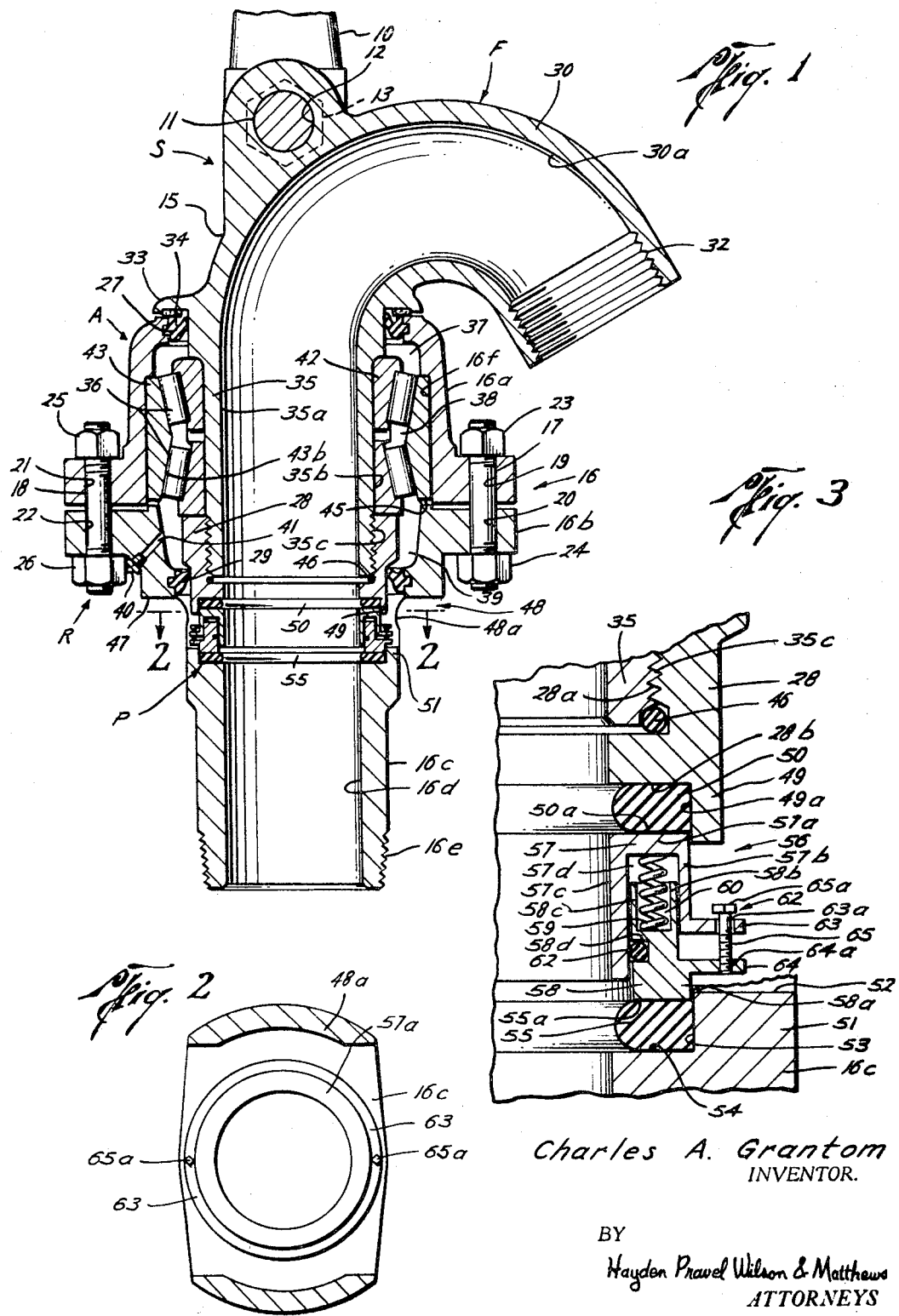

United States Patent Office 3,433,488
Patented Mar. 18, 1969

3,433,488
SELF-ADJUSTING PACKING ASSEMBLY
Charles A. Grantom, Houston, Tex., assignor to King Oil Tools, a corporation of Texas
Continuation-in-part of application Ser. No. 527,176, Feb. 14, 1966. This application May 23, 1968, Ser. No. 731,566
U.S. Cl. 277—9                9 Claims
Int. Cl. F16j 15/34, 15/54; F16l 21/00

ABSTRACT OF THE DISCLOSURE

A self-adjusting packing assembly for a swivel having a packing assembly which automatically compensates for wear on the packing rings thereof and which is readily removable from the swivel without disassembly of the swivel.

---

This application is a continuation-in-part of U.S. application Ser. No. 527,176, filed Feb. 14, 1966.

It is an object of this invention to provide a new and improved packing assembly for well pipe swivels wherein the packing assembly may be easily removed from the swivel without special tools for replacement or repair which thereby decreases shut-down time in well operations.

Yet another object of this invention is to provide a new and improved packing assembly for well pipe swivels wherein no unthreading or rotation of the swivel parts is required for removal and/or replacement of the packing assembly and wherein disassembly of the bearings of the swivel is avoided during the removal and/or replacement of the packing assembly.

Still another object of the present invention is to provide a new and improved packing assembly for well swivels mounted adjacent to the movable and stationary parts thereof wherein the packing assembly is provided with packing rings and an automatically adjusting bushing mounted between such rings for continuously urging the packing rings to sealingly engage between the movable and stationary parts of the swivel.

The preferred embodiment of this invention will be described hereinafter, together with other features thereof, and additional objects will become evident from such description.

The invention will be more readily understood from a reading of the following specification and by reference to the accompanying drawing forming a part thereof, wherein an example of the invention is shown, and wherein:

FIG. 1 is a vertical sectional view of a swivel taken on line 1—1 of FIG. 4 and illustrating the construction of the swivel and the position of the packing assembly in the swivel;

FIG. 2 is a view taken along line 2—2 of FIG. 1;

FIG. 3 is a partial sectional view illustrating in detail the preferred embodiment of the self-adjustment packing assembly of this invention;

FIG. 4 is a view partly in elevation and partly in section, of the swivel of FIGS. 1–3, with the swivel rotated ninety degrees from the position shown in FIG. 1; and FIG. 5 is a perspective view of the swivel, with the wear bushing and seal rings removed for purposes of illustration.

In the drawings, the letter S generally designates the well swivel of this invention which is provided with a movable section R which rotates relative to a stationary section F of the swivel S. The swivel S is provided with a bail 10 (partially shown) for supporting the swivel S from any suitable support such as a cable (not shown) in a well derrick in a manner well known in the art. With this invention, a self-adjusting or automatically compensating packing assembly P is mounted with the swivel S for preventing leakage of fluid or drilling mud from the interior of the swivel S during rotation of the movable section R relative to the stationary section F. The packing assembly P is constructed so that it is removable laterally from the swivel S without the necessity of removing any other parts of the swivel. The packing assembly P is also constructed so that it is easily removable from the swivel S without the requirement of special tools and therefore readily lends itself to replacement and repair in the field. Additionally, the packing assembly P is self-adjusting or automatically compensating so that even as the packing wears, the sealing action of the packing assembly continues to be effective.

As illustrated in FIGS. 1, 4 and 5, the swivel S has a gooseneck 15 and a bearing housing 16, which is part of the movable swivel section R. The bearing housing 16 is provided with upper and lower bearing housing parts or sections 16a and 16b, respectively. The bearing housing sections 16a and 16b are secured together by a pair of housing bolts 17 and 18 which extend through openings 19, 20, 21 and 22 in the housing sections and which are threadedly engaged at each end thereof to a plurality of housing nuts 23, 24, 25 and 26. The housing section 16a is sealingly engaged to the tube 35 at a point adjacent and below the gooseneck 15 through an upper housing seal 27; the lower housing section 16b is sealingly engaged to a bearing lock nut 28, by a lower housing seal 29.

The gooseneck 15 has a curved tube or pipe 30 with an internal bore 30a which merges with a substantially longitudinal passage 35a in the straight tube 35. As illustrated in FIG. 1, the internal bore 35a communicates with, and is in axial alignment with, bore 16d of the lower housing section 16c which is integrally secured to the lower housing section 16b, as explained in detail hereinafter. At the other extremity of the bore 30a, a plurality of internal threads 32 are provided for connecting a hose or other fluid conductor (not shown) with the gooseneck 30.

A flange 33 positioned immediately adjacent and below the gooseneck 15, has a washer 34 of felt or other suitable material disposed therebelow to retain lubricant in the bearing, as will be more evident hereinafter.

As previously mentioned, the bail 10 is pivotally connected to the gooseneck 15 by a pivot pin 11 which extends through an opening 12 of the gooseneck 15. The pivot pin 11 is prevented from slipping from the opening 12 by retainer means such as nuts 13 which are threaded or otherwise secured to the pivot pin 11. The lower housing section 16C has threads 16e for receiving a well pipe, kelly or other suitable rotatable pipe as is well known to those skilled in the art. As the lower housing section 16c rotates, the packing assembly P (as will be explained in detail) also rotates while the gooseneck 15, bearing lock nut 28 and the tubular section 35 remain stationary. Of course it should now be understood that the movable section R includes the housing section 16 and substantially all of the packing assembly P while the stationary section F of the swivel S includes the gooseneck 15, bearing lock nut 28, and tubular section 35. To facilitate the rotation of the bearing housing section 16 relative to the gooseneck 15 and tubular section 35 and to reduce the friction therebetween, a bearing assembly A such as tapered bearings 36 are provided for thrust and radial forces or loads.

The bearings 36 are positioned between the upper housing section 16a and tubular section 35, and below the upper housing seal 27 and above the lower housing seal 29. A plurality of annular passages, such as illustrated at 37, 38 and 39, are provided for continuously lubricating the bearings 36 through a lubricating fitting 40 and a lubricating fitting passage 41 which communicates with an annular lubricating passage 39. The bearings 36 are provided between conventional bearing races 42 and 43. A laminated shim 45 is preferably positioned between the upper and lower housing sections 16a and 16b, respectively.

The bearing race 42 is positioned and secured between the tubular section 35 and the bearing 36. The outer bearing race 43 is fitted to the interface 16f of the upper housing section 16a. The bearing assembly A is retained in position by the bearing lock nut 28 by an engagement of internal threads 28a with threads 35c on the tube 35. As illustrated in FIGS. 1 and 3, an O-ring or other bearing nut seal 46 formed of rubber or other suitable sealing material is provided for sealingly engaging and thereby preventing the escape of fluid between the tubular section 35 and the bearing lock nut 28.

As mentioned hereinabove, the lower housing sections 16b and 16c are integral or are connected together. At a lower face 47 of the housing section 16b, adjacent the bearing lock nut 28 and below and adjacent lower housing seal 29 is a laterally extending window 48 which extends through the housing section 16c and which is used to replace and repair the packing assembly P, as will be explained hereinafter. The window 48 is provided with longitudinally extending curved side walls 48a (FIGS. 1, 2 and 4).

The bearing lock nut 28 has an annular lip 49 (FIG. 3) which extends downwardly to provide the upper edge of the window 48. A packing ring 50 which is constructed of rubber, Teflon asbestos, leather or the like is positioned for sealing engagement with an interface 49a of the annular lip 49 and a base 28b of the bearing lock nut 28.

As illustrated in FIG. 3, the lower housing section 16c is also provided with an annular lip or shoulder 51 which has an upper flat surface 52 defining the lower edge of the window 48. A packing ring 55 which is preferably made of the same material and is of a similar construction to the packing ring 50 is positioned in sealing engagement with an interface 53 and an abutting flat surface 54. An automatically adjustable wear bushing or automatically compensating wear bushing 56 is positioned between upper packing ring 50 and the lower packing ring 55 for continuously urging the upper and lower packing rings 50 and 55 away from each other. Thus, the bushing 56 serves to maintain the packing rings 50 and 55 in sealing engagement with the bearing lock nut 28 and the lower housing section 16c, respectively, as the rings 50 and 55 become worn.

The automatically adjustable wear bushing 56 includes an upper ring section 57 and a lower ring section 58 preferably formed of steel or other metal, with a resilient means such as springs 59, annularly disposed and mounted therebetween. The upper metal section 57 in the form of a ring with a U-shaped cross-section has a base 57a in sealing engagement with a bottom surface 50a of the upper packing ring 50 and as will be more fully explained, the section 57 is retained in the window 48 between the seal rings 50 and 55 by the lip 49 during use of the swivel. Extending outwardly and downwardly from the base 57a is a pair of concentric cylinders or dependent arms 57b and 57c which define an annular opening 57d therebetween for receiving the springs 59. The lower ring section 58 has a pair of upwardly extending concentric cylinders or annular arms 58b and 58c which extend from a base 58a to form a U-shaped cross-section. The base 58a of the lower section 58 is in sealing engagement with the upper surface 55a of the lower packing ring 55. As will be more fully explained, the lower ring section 58 is retained in the window 48 between the seal rings 50 and 55 by fitting against the interface 53 of the annular lip 51 and the lower packing ring 55. The base 58a and upwardly extending arms 58b and 58c form an annular opening 60 which, together with the annular recess 57d, is adapted to receive the resilient means 59 which in the preferred embodiment is shown as being a plurality of annularly spaced coil springs, preferably eight in number, and confined under compression between the ring sections 57 and 58.

The spring means 59 urges the ring sections 57 and 58 longitudinally away from each other to exert a compressive force on the upper and lower packing rings 50 and 55, respectively, so that sealing engagement between the rings 50 and 55 and the bearing lock nut 28 and lower housing section 16c, respectively, may be maintained. It should be noted that an O-ring seal 62 formed of rubber or similar material is provided in an annular means 58d for sealing engagement between the sections 57 and 58 for preventing fluid flow from the inner fluid passage or bore 30b. The upper packing ring 50 is in sealing engagement with the base 28b and the surface 49a of the bearing lock nut 28 and therefore remains stationary during rotation of the movable section R because the bearing lock 28 remains stationary. The automatically compensating wear bushing 56 rotates relative to the upper packing ring 50 and normally wears down the packing ring surface 50a immediately adjacent the base 57a of the U-shaped ring section 57.

A lock and limit means or locking element 62 is mounted or otherwise connected with each of the sections 57 and 58 and includes laterally extending tabs 63 and 64 which are preferably annular or circular, although the shape may be varied. One or more threaded bolts or screws 65 are inserted through an opening or openings 63a and are threadedly engaged to the internal threads 64a in the tab 64.

When it is desired to insert or remove the packing assembly P, the tabs 63 and 64 are compressed or squeezed together by hand or with a tool such as pliers which compresses the spring means 59 sufficiently to enable the adjustable wear bushing 56 to be laterally inserted or removed past the annular lips 49 and 51. This of course, also permits the rings 50 and 55 to be easily removed and replaced if they become excessively worn during use of the swivel S.

In the operation or use of the swivel S of this invention, the bail 10 is secured to a cable (not shown) or other suitable support for supporting the swivel S in any suitable well derrick. The lower section 16c of the swivel S is connected with a kelly (not shown) or other well pipe by the threaded engagement of the kelly or well pipe with the external threads 16c. A stationary hose (not shown) of any known construction is coupled in threaded engagement with the internal threads 32 of the curved tube 30 for communicating drilling mud or fluid from the hose through the swivel S to the kelly and well pipe therebelow, as is well understood by those skilled in the art.

As the drilling mud flows through the swivel S, the movable section R rotates relative to the stationary section F of the swivel S. As mentioned previously, the lower packing ring 55 is sealingly engaged at the interface 53, the upper surface 54 of the housing section 16c, and the base 58a. As the lower housing section 16c rotates, the packing ring 55 and the lower ring section 58 also rotate. As the lower section 58 rotates, the lock and limit means 62 locks the upper section 57 to the lower section 58 so that the adjustable wear bushing 56 rotates as a unit when the lower housing section 16c is rotating. By reason of the frictional resistance on the upper section 57 caused by engagement between the base 57a and stationary packing ring 50, the adjustable wear bushing 56 rotates at a slower rotational speed than the lower packing ring 55 and housing section 16c. Normally, the bushing 56 rotates at about one-half of the speed of the lower housing section 16c and the packing ring 55.

Due to such relative rotation of the bushing 56 and the ring 50, the lower surface 50a becomes worn, and since the adjustable wear bushing 56 does not rotate at the same relative speed as the rotating lower packing ring 55, the surface 55a also becomes worn. The extent of wear on each of said packing rings 50 and 55 may vary, depending upon the relative speed of the bushing 56 with respect to each of the packing rings 50 and 55.

As the packing ring surfaces 50a and 55a become worn, the spring means 59 continuously urges the sections 57 and 58 away from each other due to the compression of such spring means 59, so that sealing engagement between the upper and lower sections 57 and 58 and the surfaces 50a and 55a respectively, is continuously maintained.

However, when the packing rings 50 and 55 have become excessively worn or have become so worn that either the upper or lower sections 57 and 58 would engage the bearing lock nut 28 or the lower housing section 16c, the lock and limit means 62 is utilized to prevent the galling of these metal pieces and sections. Thus as the surfaces 50a and 55a become worn, the sections 57 and 58 move away from each other until tab 63 has engaged the head 65a on the bolt 65, which prevents the adjustable wear bushing 56 from engaging other portions of the swivel S.

This feature of the lock and limit means 62 provides a visual indication that the packing rings 50 and 55 have become worn and the rings need to be removed and replaced. It is to be noted that the lock and limit means 62 may be adjusted longitudinally so that the sections 57 and 58 may be permitted to move away from each other any desired amount. While only one lock and limit means 62 has been described in detail, there preferably are at least a pair of such means 62.

To completely remove the wear bushing 56 from the swivel S, as illustrated in FIG. 5, the tabs 63 and 64 are compressed together by hand, pliers or other tool to thereby reduce the overall height of the bushing 56 from the upper surface of the ring section 57 to the lower surface of the ring section 58 to a distance less than the distance between the lower edge of the lip 49 and the upper surface 52, whereby the entire bushing 56 may be removed through the window 48. Thereafter, each packing ring 50 and 55 may be removed also (FIG. 5). The same procedure in reverse is followed for inserting the packing rings 50, 55 and the wear bushing 56.

It should be further noted the specific form of the lock and limit means 62 is shown by way of example and other variations may be employed so long as the sections 57 and 58 are adjustably locked together. If desired, one other arrangement for a lock and limit means is to extend the tabs 63 and 64 until they engage wall 48a when the lower housing section 16c is rotated. This action prevents the adjustable bushing 56 from rotating with the subsequent effect that only the surface 55a of the one rotating packing ring 55 become worn during rotation of the housing 16c. Also, in some instances, instead of using the bolt 65, the sections 57 and 58 may be pinned or otherwise connected together for longitudinal relative movement but without limiting the extent of longitudinal separation except by the engagement of the rings 57 and 58 with the rings 50 and 55, respectively.

What is claimed is:

1. In a well swivel having a window with upper and lower edges and wherein the swivel is provided with longitudinally spaced movable and stationary sections, a packing assembly comprising:
   (a) an upper packing ring in sealing engagement with the stationary section of the swivel and spaced longitudinally from the movable section,
   (b) a lower packing ring in sealing engagement with the movable section of the swivel and spaced longitudinally from the stationary section,
   (c) an automatically adjustable wear bushing mounted between said upper and lower packing rings;
   (d) means forming a part of said wear bushing for continuously urging said rings to sealingly engage between the longitudinally spaced sections of the swivel as said upper and lower rings become worn through rotation of the movable section of the swivel and said wear bushing; and
   (e) means forming a part of said bushing for reducing the longitudinal dimension thereof to enable said bushing to be laterally removed from the window separately from said upper and lower packing rings.

2. The structure set forth in claim 1, wherein:
   (a) said automatically adjustable bushing includes:
      (1) an upper section sealingly engaged with said upper packing ring,
      (2) a lower section sealingly engaged with said lower packing ring, and
   (b) said means for continuously urging said rings to sealingly engage between the sections of the swivel includes resilient means mounted between said upper and lower sections for urging said sections away from each other and in sealing engagement with said upper and lower packing rings respectively.

3. The structure set forth in claim 2, including means for locking said upper and lower sections together for rotation of said adjustable wear bushing with said movable section.

4. The structure set forth in claim 3, wherein the longitudinal distance from the upper and lower surfaces of said wear bushing when assembled in sealing engagement with said upper and lower packing rings is greater than the longitudinal distance between the upper and lower edges of the window of the swivel whereby lateral shifting of said wear bushing is prevented during use.

5. The structure set forth in claim 3, wherein said means for locking includes:
   (a) an outwardly extending tab mounted with each of said upper and lower sections, and
   (b) a locking element secured to one of said tabs and slidably connected to the other of said tabs so that said upper and lower sections rotate as a unit while also being longitudinally movable relative to each other.

6. The structure set forth in claim 5, including:
   (a) limit means with said locking element for limiting the extent of longitudinal movement of the sections away from each other,
   (b) said tab mounted with said upper section having an opening for receiving said locking element,
   (c) said tab mounted with said lower section being threadedly engaged with said locking element whereby as said upper and lower rings become worn and said upper and lower sections thereby move away from each other the limit means on said locking element engages said tab mounted with upper section to prevent said upper and lower sections from engaging and galling either of said sections of the swivel.

7. The structure set forth in claim 6, wherein said limit means is longitudinally adjustable so that the movements of said upper and lower sections away from each other as said upper and lower rings become worn is thereby controlled and made adjustable.

8. The structure set forth in claim 2, wherein:
   (a) said upper section of said adjustable wear bushing includes an annular ring section having a U-shaped cross-section with depending arms and an annular recess between said arms for receiving said resilient means, and
   (b) said lower section of said adjustable wear bushing includes an annular ring section having a U-shaped cross-section with upwardly extending arms inside of and adjacent to said depending arms of said upper section and having an annular recess for also receiving said resilient means.

9. The structure set forth in claim 8, including:
   (a) a fluid-tight seal mounted between said upper and lower sections for sealingly engaging between said upper and lower sections to prevent fluid from escaping from the swivel.

(References on following page)

References Cited

UNITED STATES PATENTS

| | | | |
|---|---|---|---|
| 2,237,715 | 4/1941 | Shaw et al. | 285—31 |
| 2,964,340 | 12/1960 | Kinzie et al. | 277—62 |
| 2,981,557 | 4/1961 | Donnell et al. | 285—32 |
| 3,301,191 | 1/1967 | Warren | 277—62 X |

SAMUEL ROTHBERG, *Primary Examiner.*

U.S. Cl. X.R.

277—62, 83; 285—31, 276